(12) United States Patent
Malloy

(10) Patent No.: US 9,400,119 B2
(45) Date of Patent: *Jul. 26, 2016

(54) RETROFITTING A CONSTANT VOLUME AIR HANDLING UNIT WITH A VARIABLE FREQUENCY DRIVE

(71) Applicant: Rockwell Automation Technologies, Inc., Mayfield Heights, OH (US)

(72) Inventor: Ronald M. Malloy, New Berlin, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 13 days.

This patent is subject to a terminal disclaimer.

(21) Appl. No.: 14/589,459

(22) Filed: Jan. 5, 2015

(65) Prior Publication Data

US 2015/0120064 A1    Apr. 30, 2015

Related U.S. Application Data

(63) Continuation of application No. 12/234,889, filed on Sep. 22, 2008, now Pat. No. 8,955,761.

(60) Provisional application No. 61/037,896, filed on Mar. 19, 2008.

(51) Int. Cl.
*F24F 7/00* (2006.01)
*F23N 5/20* (2006.01)
*G05D 23/00* (2006.01)
(Continued)

(52) U.S. Cl.
CPC ............. *F24F 11/0009* (2013.01); *F24F 3/044* (2013.01); *F24F 11/001* (2013.01); *G05B 15/02* (2013.01); *F24F 11/0017* (2013.01); *F24F 11/0034* (2013.01); *F24F 11/0079* (2013.01); *F24F 2011/0026* (2013.01); *Y02B 30/28* (2013.01); *Y02B 30/746* (2013.01); *Y02B 30/767* (2013.01); *Y02B 30/78* (2013.01); *Y02B 30/94* (2013.01)

(58) Field of Classification Search
CPC .. F24F 11/0012; F24F 11/006; F24F 11/0079
USPC ....................................................... 236/46 R
See application file for complete search history.

(56) References Cited

U.S. PATENT DOCUMENTS 4,107,941 A    8/1978   Hamilton
4,996,849 A    3/1991   Burst et al.
(Continued)

OTHER PUBLICATIONS

Final Office Action dated Jul. 23, 2014, for U.S. Appl. No. 12/234,889, 28 pages.

(Continued)

*Primary Examiner* — Allen Flanigan
*Assistant Examiner* — Filip Zec
(74) *Attorney, Agent, or Firm* — Amin, Turocy & Watson, LLP

(57) ABSTRACT

A system and methods providing real-time monitoring, management and control of a variable frequency drive retrofit to a constant volume air handling unit without making significant mechanical or control system changes. Customers and vendors are provided with a more informative and economically attractive air handling unit. The system also provides a finer granularity of control over conditioned air properties such as temperature, humidity and air quality.

20 Claims, 9 Drawing Sheets

(51) Int. Cl.
*F25D 21/00* (2006.01)
*F25D 21/06* (2006.01)
*F25C 5/18* (2006.01)
*F24F 11/00* (2006.01)
*F24F 3/044* (2006.01)
*G05B 15/02* (2006.01)

(56) References Cited

U.S. PATENT DOCUMENTS

| | | | |
|---|---|---|---|
| 5,065,593 A | 11/1991 | Dudley et al. | |
| 5,490,394 A | 2/1996 | Marques et al. | |
| 5,755,378 A | 5/1998 | Dage et al. | |
| 5,924,486 A | 7/1999 | Ehlers et al. | |
| 6,216,956 B1 | 4/2001 | Ehlers et al. | |
| 6,259,074 B1 | 7/2001 | Brunner et al. | |
| 6,318,096 B1 * | 11/2001 | Gross | F24F 11/0076 165/249 |
| 6,464,464 B2 | 10/2002 | Sabini et al. | |
| 6,595,430 B1 | 7/2003 | Shah | |
| 6,860,431 B2 * | 3/2005 | Jayadev | F24F 11/006 236/46 F |
| 7,130,719 B2 | 10/2006 | Ehlers et al. | |
| 7,398,821 B2 * | 7/2008 | Rainer | F24F 11/006 165/244 |
| 7,891,573 B2 | 2/2011 | Finkam et al. | |
| 2001/0048030 A1 | 12/2001 | Sharood et al. | |
| 2002/0008149 A1 | 1/2002 | Riley et al. | |
| 2003/0146289 A1 | 8/2003 | Sekhar et al. | |
| 2004/0007628 A1 | 1/2004 | Paul et al. | |
| 2004/0074978 A1 | 4/2004 | Rosen | |
| 2005/0156052 A1 | 7/2005 | Bartlett et al. | |

OTHER PUBLICATIONS

Final Office Action dated Dec. 21, 2012, for U.S. Appl. No. 12/234,889, 31 pages.
Non-Final Office Action dated May 10, 2012 for U.S. Appl. No. 12/234,889, 21 pages.
Non-Final Office Action dated Dec. 30, 2013 for U.S. Appl. No. 12/234,889, 27 pages.
Notice of Allowance dated Oct. 3, 2014 for U.S. Appl. No. 12/234,889, 24 pages.

* cited by examiner

RETROFITTING A CONSTANT VOLUME AIR HANDLING UNIT WITH A VARIABLE FREQUENCY DRIVE

CROSS REFERENCE TO RELATED APPLICATIONS

This application is a continuation of U.S. patent application Ser. No. 12/234,889 filed Sep. 22, 2008 and entitled RETROFITTING A CONSTANT VOLUME AIR HANDLING UNIT WITH A VARIABLE FREQUENCY DRIVE, which claims benefit of U.S. patent application Ser. No. 61/037,896, filed Mar. 19, 2008 and entitled RETROFITTING A CONSTANT VOLUME AIR HANDLING UNIT WITH A VARIABLE FREQUENCY DRIVE. The entireties of each are incorporated herein by reference.

BACKGROUND

A large percentage of the air handling systems currently in use were installed in the decades of the eighties and nineties and are of constant air volume design. These systems heated or cooled a constant and usually larger than necessary volume of air based on a designed maximum required air delivery volume. During much of the operating times of these systems, a large amount of energy is wasted in unnecessary heating or cooling of these maximum volumes of air for ventilation or the distribution of heating or cooling energy. The wasted energy translates to higher costs of manufacturing and consequently higher product costs and a less competitive position in the marketplace.

The advent of variable frequency drives created an opportunity to optimize the installed base of constant volume air handling units by converting the air handling units to variable flow. The invention matches the fan energy with energy required to move heating or cooling energy away from the heat exchangers and matches the fan energy required to provide air for ventilation. Installing a variable frequency drive to operate the air handling unit blower would allow for the heating or cooling of only the required volume of air. However, this simple retrofit solution led to other problems related to reducing the air volume through the air handling unit such as freezing of the cooling coils or overheating of the heating elements or heat exchangers. Consequently, the economic advantages of reducing the energy requirements to heat or cool a smaller volume of air were overtaken by the capital investment costs of the air handling unit mechanical and control system modifications.

The systems available now included one that held the air volume constant and varied the discharge temperature or one that held the discharge temperature constant and varied the air volume. The initial step of adding variable air volume was an improvement over the constant volume system from an energy consumption perspective but introduced other problems such as overheating heating coils or freezing cooling coils on retrofit applications. The market demanded a better solution than either of these two types of systems provided for new installations or for retrofitting a constant volume air handling system to variable air flow.

The recognition of the value in reduced operating cost of variable frequency drives in air handling units resulted in new installations incorporating variable frequency drives and their associated mechanical and control system modifications in new installations. However, the large installed base of constant volume air handing units were left without a solution offered to new installations. The recent drastic increase in energy costs has served to increase the already present market pressure for a retrofit solution of variable air flow including a variable frequency drive without the associated capital costs of replacing mechanical components and existing control systems.

SUMMARY

The following presents a simplified summary in order to provide a basic understanding of some aspects of the disclosed innovation. This summary is not an extensive overview, and it is not intended to identify key or critical elements or to delineate the scope of the invention. Its sole purpose is to present some concepts in a simplified form as a prelude to the more detailed description presented later.

The subject invention provides for retrofitting a variable frequency drive to an existing air handling unit without extensive mechanical modifications or modifying the existing control system. Temperature sensors are installed before and after the heating and cooling coils for determining the air temperature difference and the absolute temperature of the air exiting the heat exchange area of the air handling unit. A damper end switch is installed, if necessary, on the outside air dampers to indicate the system is operating in economizer mode. Economizer mode is functional when the outside air temperature is low enough allowing the outside air use for cooling instead of providing cooling from the cooling coils in the heat exchange area of the air handling unit. The variable frequency drive control system is included with the variable frequency drive and controls the variable frequency drive without replacement or modification of the existing air handling unit control system.

In another aspect of the invention, an air quality sensor and a motion detector sensor are is installed in the conditioned air space for determining the need for fresh air based on air composition and the presence of individuals in the conditioned space. If fresh air is required, a damper is opened allowing fresh air to mix with recycled air before passing through the heat exchange area of the air handling unit and the fan is ramped up to full speed.

The subject invention addresses the need created by market pressure for incorporating a variable frequency drive into an existing air handling unit without the capital intensive requirements of extensive mechanical modifications or control system replacement. After installation, savings are realized in operating costs because of the lower energy requirements for the variable frequency drive's operation and lower energy costs by heating or cooling a smaller volume of outdoor air as compared to the previous constant volume air handling system. Only the amount of outdoor air for ventilation that is required to maintain an acceptable level of indoor air quality is heated, cooled or dehumidified saving significant heating, cooling and dehumidification energy and the associated cost. In this regard, the subject invention provided both a variable air flow and a variable discharge temperature as control points providing both a reduction in operating costs and the elimination of the problems created by earlier attempts to incorporate variable frequency drives into constant volume air handling systems.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and
}

DETAILED DESCRIPTION

Figure 1:
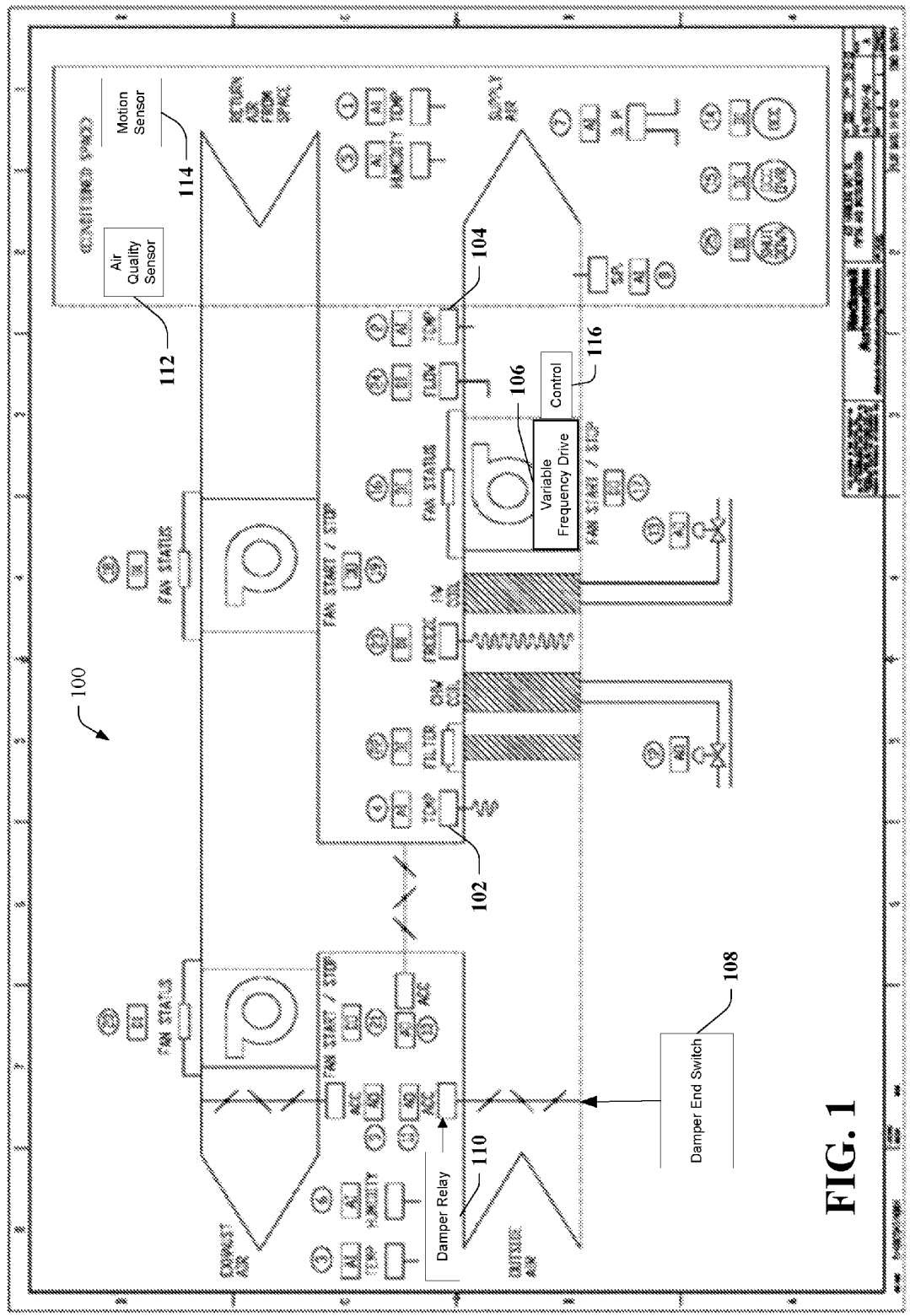
FIG. 1 depicts a block diagram of an air handling unit according to aspects of the subject disclosure.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component," "system," "equipment," "interface", "network," and/or the like are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer, an industrial controller, a relay, a sensor and/or a variable frequency drive. By way of illustration, both an application running on a server and the server can be a component. One or more components can reside within a process and/or thread of execution, and a component can be localized on one computer and/or distributed between two or more computers.

In addition to the foregoing, it should be appreciated that the claimed subject matter can be implemented as a method, apparatus, or article of manufacture using typical programming and/or engineering techniques to produce software, firmware, hardware, or any suitable combination thereof to control a computing device, such as a variable frequency drive and controller, to implement the disclosed subject matter. The term "article of manufacture" as used herein is intended to encompass a computer program accessible from any suitable computer-readable device, media, or a carrier generated by such media/device. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave generated by a transmitter can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, the terms to "infer" or "inference", as used herein, refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring to the drawings, FIG. 1 depicts a block diagram of an air handling unit including the retrofitted variable frequency drive and its supporting hardware and control system. In one aspect, the variable frequency drive system 100 includes temperature sensor 102 and analog input module 4. Temperature sensor 102 is placed in the intake air stream upstream of the heat exchange area of the air handling unit. The temperature sensor 102 provides the intake air temperature of the mixed air entering the heat exchange area of the air handling unit. The mixed air can be recycled air from the conditioned space area or a combination of recycled air from the conditioned space area and outside air. The percentage of the combined air is determined by several factors such as the need for fresh air or the ability to operate in economizer mode. Economizer mode is available when the outside air temperature is cool enough to allow cooling based on the outside air temperature instead of requiring operation of the cooling coils. Temperature sensor 102 measures the temperature of the mixed air stream and provides the electrical or air signal representing the measurement to analog input 4. Analog input 4, communicatively coupled to the variable frequency drive 106 provides the upstream air temperature to the control system 116 associated with the variable frequency drive. One or more temperature sensors 102 can be installed based on the size and/or configuration of the air handling unit.

In another aspect, the variable frequency drive system includes temperature sensor 104 and analog input 2. Temperature sensor 104 is placed in the discharge air stream downstream of the heat exchange area of the air handling unit. The temperature sensor 104 provides the discharge air temperature of the mixed air exiting the heat exchange area of the air handling unit. Temperature sensor 104 measures the temperature of the mixed discharge air stream and provides the electrical or air signal representing the measurement to analog input 2. Analog input 2, communicatively coupled to the variable frequency drive 106 provides the discharge air temperature to the control system 116 associated with the variable frequency drive. One or more temperature sensors 104 can be installed based on the size and/or configuration of the air handling unit.

The variable frequency drive 106, representing another aspect of the subject disclosure, is installed to operate the blower of the intake air for the air handling unit. The variable frequency drive converts the air handling unit from a constant volume displacement system to a variable volume displacement system by allowing the impeller of the blower to rotate at different angular velocities based on the required heating and cooling loads, indoor and outdoor relative humidity and outdoor air temperature of the conditioned space. The variable frequency drive includes a control system for controlling the variable frequency drive without modification to the existing control system for the air handling unit. One or more variable frequency drives 106 can be installed based on the size and/or configuration of the air handling unit.

In another aspect of the subject disclosure, the damper end switch 108 is installed to detect the damper allowing intrusion of outside air greater than the minimum air outside air setting. The damper position is monitored for a fifteen percent open condition from which an inference is made that the air handling unit is operating in economizer mode. While operating in economizer mode, the cooling requirements are met by the outside air temperature and therefore the cooling coils are not in operation. The variable frequency drive system, having knowledge of the alternative cooling mechanism will increase the fan speed above minimum fan speed to distribute this free cooling to the space. One or more damper end switches 108 can be installed based on the size and/or configuration of the air handling unit.

The damper relay 110, representing another aspect of the subject disclosure, is installed mechanically connected to the outside air damper actuator and communicatively connected to the variable frequency drive 106 through its associated controller 116. The variable frequency drive 106 controller 116 can also provide improved humidity and air quality control by allowing the intrusion of outside air into the air handling unit air intake stream. As many air handlers are oversized and as a result may not adequately dehumidify the air, the invention allows for lowering the coil temperature on many systems by reducing the air flow over the coil to lower the temperature causing additional dehumidification. The invention monitors the discharge temperature and will speed up the fan to avoid coil freezing. The damper relay 110 used in conjunction with air quality sensor 112 and/or motion sensor 114 allows the variable frequency drive 106 controller 116 to determine the need for fresh air based on low air quality and/or the presence of individuals in the conditioned space and send a control signal to the damper relay 110 instructing damper relay 110 to open the outside air damper allowing fresh air to mix with air recycled from the conditioned space. Conversely, the variable frequency drive 106 controller 116 can send a control signal to the damper relay 110 instructing the outside air damper to close when the air quality sensor 112 and/or the motion sensor 114 indicate the fresh air requirement is satisfied. One or more damper relays 110 can be installed based on the size and/or configuration of the air handling unit.

In another aspect of the subject disclosure, the air quality sensor 112 is installed in the conditioned space area. The air quality sensor 112 is communicatively coupled to the variable frequency drive 106 through the associated controller 116. The controller 116 determines the need for fresh air to improve air quality based on the values provided from the air quality sensor 112. One or more air quality sensors 112 can be installed based on the size and/or configuration of the air handling unit.

In one example, the air quality sensor can detect the concentration of carbon dioxide in the air of the conditioned space. When the carbon dioxide concentration reaches a predetermined set point, the controller 116 instructs the damper relay 110 to open and allow outside air to mix with the recycled air from the conditioned space until the carbon dioxide level is reduced to a predetermined concentration. The fans are also run at full speed to bring in the necessary amount of minimum outside air.

In another example, for operational environments handling known gases as components of the industrial process, air quality sensors 112 specific to the known gases can be installed to detect alarm conditions of exposure of the conditioned space to the known gas. Upon detection of the known gas by the air quality sensor 112, the controller 116 can instruct the damper relay 110 to open fully and instruct the variable frequency drive 106 to maximum angular velocity to maintain minimum concentrations of the known gas while evacuation occurs and the contamination problem is identified and corrected.

The motion sensor 114, representing another aspect of the subject disclosure, is communicatively coupled with the variable frequency drive 106 through the associated controller 116. The motion sensor 114 provides the controller 116 information representing the presence living beings in the conditioned space. The controller infers from the presence of living beings an additional requirement for fresh air and based on this additional requirement, instructs damper relay 110 to open allowing fresh outside air to mix with the recycled air from the conditioned space. After a predefined time period of no detectable movement, the controller 116 infers the living beings have left the conditioned space area and therefore instructs the damper relay 110 to close. One or more motion sensors 114 can be installed based on the size and/or configuration of the air handling unit.

In another aspect of the subject disclosure, a controller 116 is associated with the variable frequency drive 106. The controller 116 can be external to the variable frequency drive and communicatively coupled or embedded in the variable frequency drive with internal communication couplings. The controller is communicatively coupled to analog input 4 representing the intake air temperature upstream of the heat exchange area of the air handling unit and analog input 2 representing the intake air temperature downstream of the heat exchange area of the air handling unit. The controller 116 is communicatively coupled to the damper end switch 108 for determining the percentage the outside air damper is open.

The controller is communicatively coupled to the damper relay 110 for instructing the damper actuator to open or close the outside air damper. The controller 116 is communicatively coupled to the air quality sensor 112 for providing air quality information based on the composition of the air in the conditioned space. The controller 116 is communicatively coupled to the motion sensor for determining the presence of living beings within the conditioned space.

The controller 116 compares the difference between the air temperature upstream of the heat exchange area of the air handling unit with the air temperature downstream of the heat exchanger area of air handling unit to calculate an angular velocity of the blower impeller sufficient to provide the required heating or cooling demand. The controller 116 also uses the absolute air temperature provided by temperature sensor 104 to determine if the cooling coils are beginning to freeze because of the reduced air flow. If the controller 116 determines that the cooling coils are beginning to freeze then the controller instructs the variable frequency drive 106 to increase the angular velocity of the impeller and therefore the airflow across the cooling coils to prevent the cooling coils from freezing. When the air temperature from temperature sensor 104 indicates the cooling coil freeze condition has subsided, the controller 116 instructs the variable frequency drive to reduce the angular velocity of the blower impeller thus reverting again to the most economically efficient operating mode. This cycle is repeated as the steady state control condition.

Conversely, the controller 116, uses the absolute air temperature provided by temperature sensor 104 to determine if the heating coils are beginning to overheat because of the reduced air flow. If the controller 116 determined the heating coils are beginning to overheat then the controller 116 instructs the variable frequency drive 106 to increase the angular velocity of the blower impeller and therefore the airflow across the heating coils to prevent overheating. When the air temperature from sensor 104 indicates the heating coil temperature is within predetermined operating parameters, the controller 116 again instructs the variable frequency drive to reduce the angular velocity of the blower impeller thus returning to the most economically efficient operating mode. This cycle is repeated as the steady state control condition.

In another aspect of the subject disclosure, the controller 116 monitors the damper end switch for an indication that the air handling unit is operating in economizer mode. As described earlier, economizer mode occurs when the outdoor air temperature is low enough that cooling of the conditioned space can occur with mixing of outdoor air and without the use of the cooling coils. When the controller 116 detects that damper switch 108 indicates economizer mode, the controller 116 can instruct the variable frequency drive to increase the angular velocity of the blower impeller to distribute the economizer cooling.

The controller 116, in another aspect of the subject disclosure is communicatively coupled to the air quality sensor 112, the motion sensor 114, the humidity sensor 5 and the temperature sensor 1. The air quality sensor provides information to the controller 116 regarding the composition of the air in the conditioned space. The motion sensor provides information to the controller 116 regarding the presence of living beings in the conditioned space. The humidity sensor 5 provides information indicating the relative humidity in the conditioned space and the temperature sensor 1 provides information relating to the air temperature of the conditioned space.

The controller 116 combines all the information from the sensors in the conditioned space to analyze current conditions and calculate the outputs required to maintain the conditioned space at optimal conditions while reducing the operating costs of the air handling unit. The variable angular velocity nature of the variable frequency drive 106 permits a finer granularity of control of the parameter associated with conditioned space. For example, the subject invention can more accurately control the humidity of the conditioned space because it can run the blower for a longer period of time without overly cooling the conditioned space. In another example, the subject invention can determine if living beings are present in the conditioned space therefore reducing operating costs based on the original system providing fresh air to the conditioned space at times when no living beings are present in the space. For example, over a weekend when the conditioned space is void of living beings, the controller 116 will not inject fresh air requiring substantially more heating, cooling or dehumidification than recycled air currently in the conditioned space.

The controller 116 can be communicatively connected to a visualization system for providing information to the visualization system necessary to graphically represent the conditioned space and the air handling unit. The visualization system can read information from the controller 116 or write information to the controller 116. The visualization system can also be used to program the controller with the logic and data necessary to operate the air handling unit.

Figure 2:
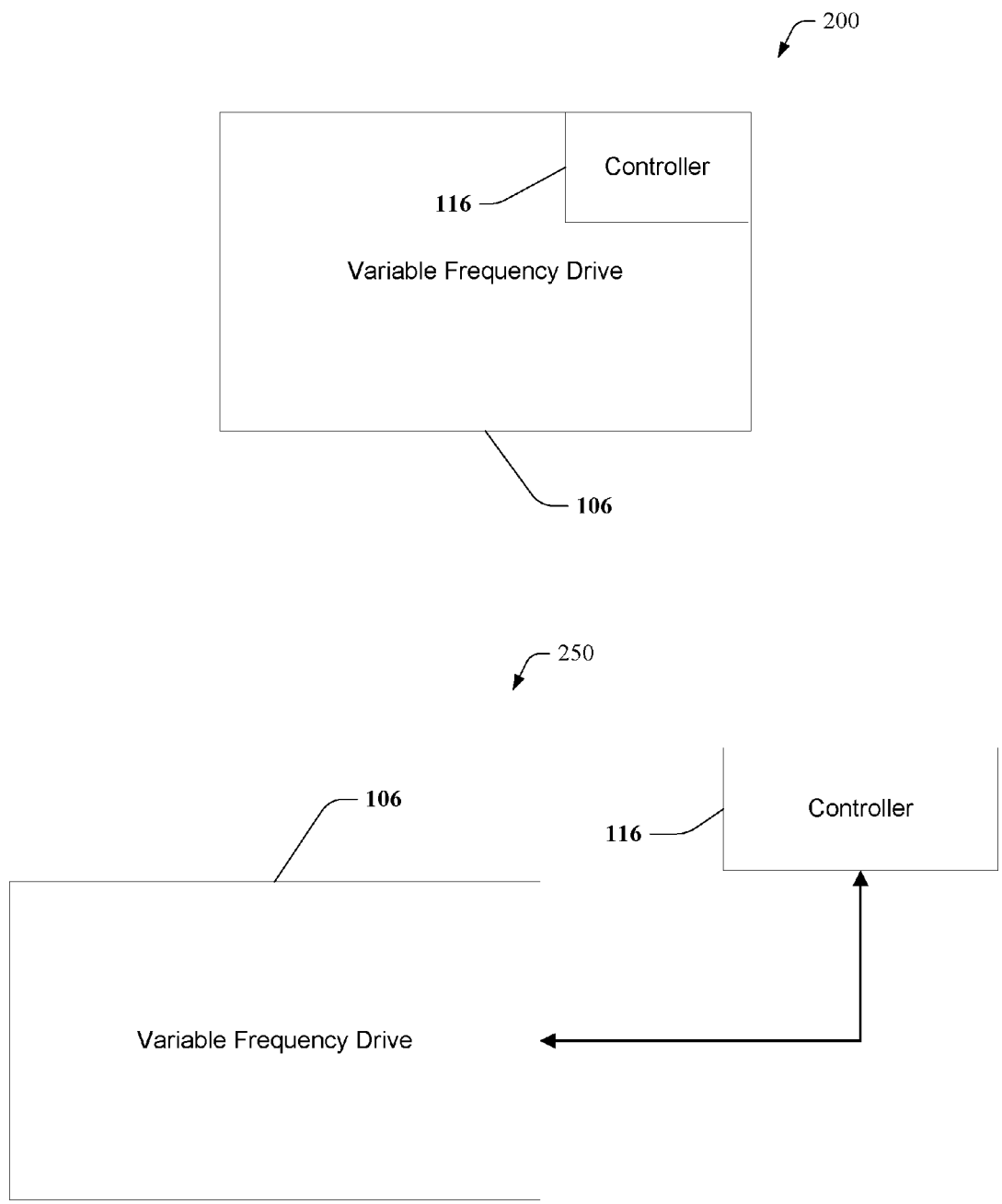
FIG. 2 depicts a block diagram of the variable frequency drive (VFD) illustrating the included VFD control system.

Referring again to the drawings, FIG. 2 depicts in 200 the variable frequency drive 106 with the controller 116 embedded in the variable frequency drive 106. The controller 116 and the interface for the input and output modules are integrated into the variable frequency drive providing simple retrofit installation. The integrated nature of the variable frequency drive 106 and the controller 116 provides the most economical implementation by eliminating any redundant components.

In another aspect of the subject disclosure, FIG. 2 depicts in 250 a separate controller 116 communicatively connected to the variable frequency drive. This implementation provides the flexibility to select any controller for the application including a preexisting controller. In another aspect of the subject innovation depicted by FIG. 2, the separate controller 116 can be installed prior to installation of the variable frequency drive to collect data concerning the operation of the constant volume air handing system. After approximately two weeks of monitoring the existing system, the data can be inspected and calculations performed to provide predicted cost savings based on the installation of the proposed system. At this point the temporary controller can be removed and reinstalled as part of the variable frequency drive system if the proposal is accepted.

In another aspect of the subject innovation depicted a in FIG. 2, after the installation of the variable frequency drive system, the controller continues to monitor the operation of the variable frequency drive system providing data for calculating the efficiency of the newly installed system to confirm the system is operating to peak efficiency. The controller maintains eleven different groups of fan speeds spread out over the full range of allowable fan speeds. The controller samples the fan speed once a minute and places an indication of the current fan speed in the appropriate group each time the controller takes a sample. The controller also maintains average fan speeds on a monthly and annual basis for a period of up to fifteen years.

In another aspect of the subject innovation, the controller maintains a database of weather service data to calculate the actual savings created by the installation of the variable frequency drive system. For example, the controller will monitor and calculate the actual cost of use of the variable frequency drive system and compare that to the cost of use of the original constant volume air handling system based on the data provided by the weather service data at the location of the installation.

Figure 3:
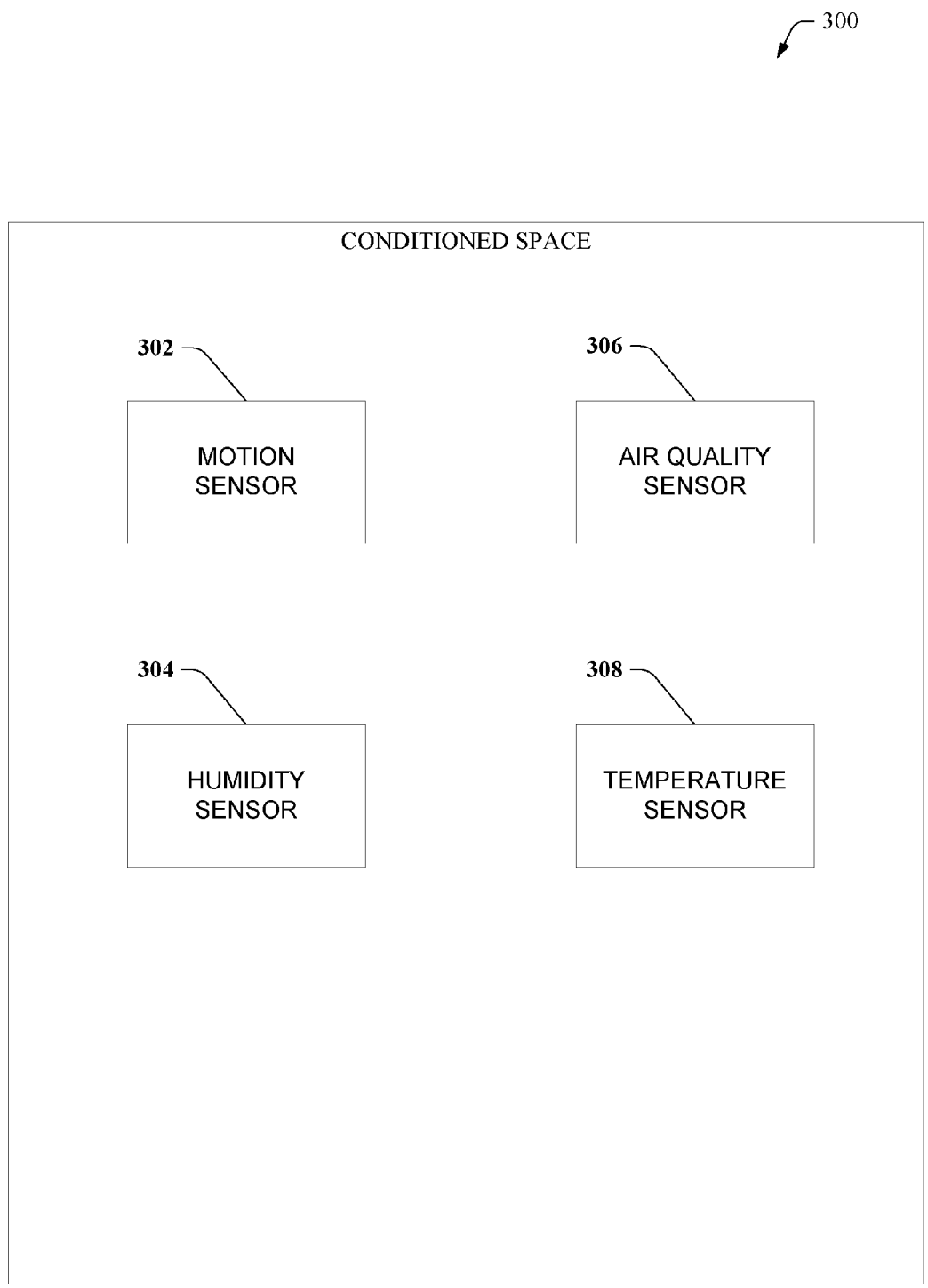
FIG. 3 depicts a block diagram of a conditioned space and the possible sensors located in the conditioned space for a variable frequency drive and controller retrofitted to a constant volume air handling system.

Referring again to the drawings, FIG. 3 represents conditioned space serviced by the variable frequency speed drive, controller and air handling system. The motion sensor 302 is installed in one or more locations of the conditioned space to provide the control system the ability to determine whether the air conditioning requirements are based on the presence of people or minimal requirements to maintain building integrity. If the motion detectors indicate movement in the conditioned space then the control system will maintain the space parameters at the configured values associated with human occupancy.

In another aspect of the subject innovation, an air quality sensor 306 measures the carbon dioxide concentration in the conditioned space as an indicator of air quality. When the air quality sensor indicates the conditioned air is becoming stuffy, as represented by a carbon dioxide measurement greater than 700 parts per million (ppm) of carbon dioxide for example, the VFD control system increases the air flow rate to the subject space whether or not heating or cooling is required.

Figure 4:
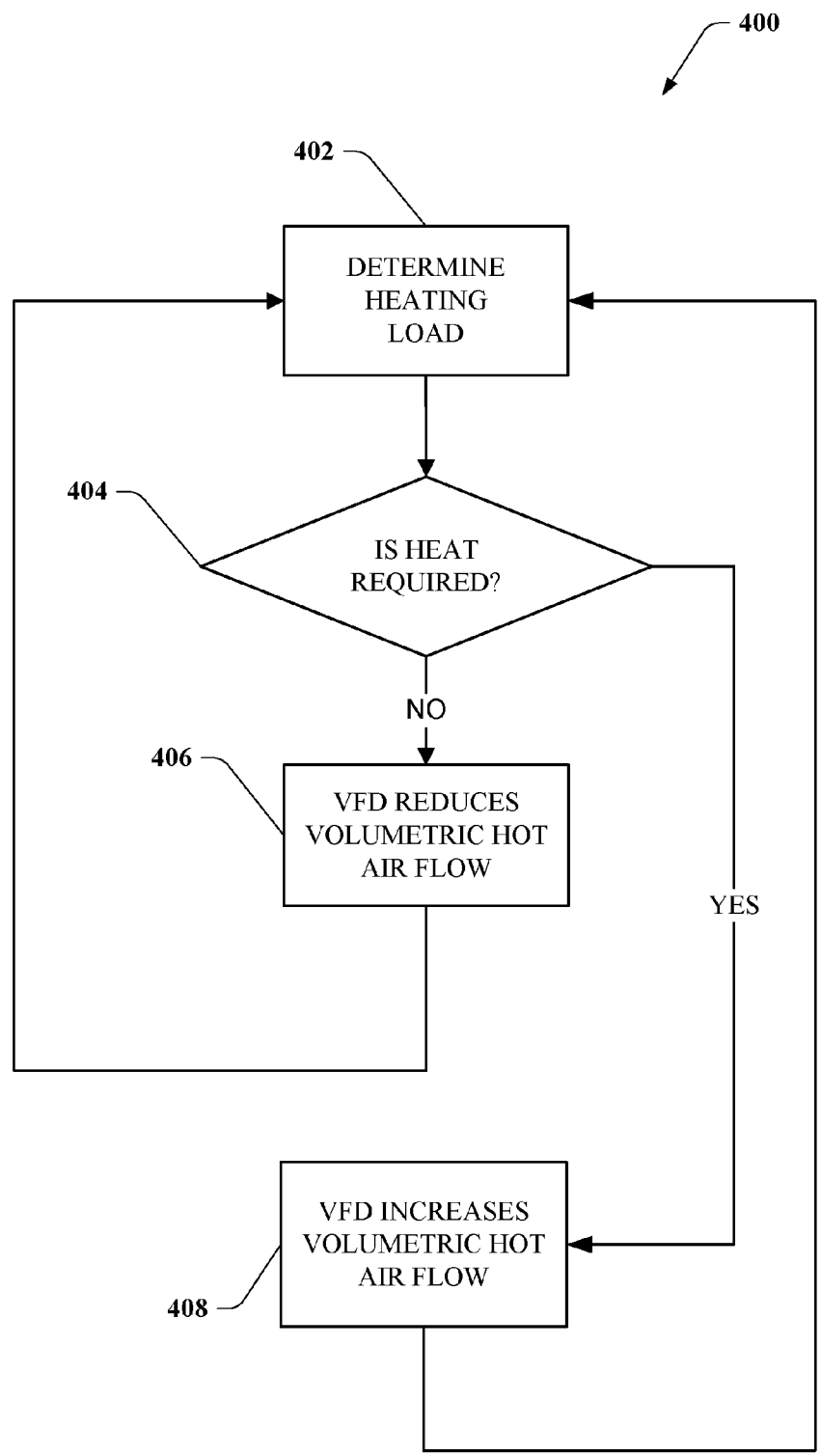
FIG. 4 depicts a method of satisfying a heating requirement to a conditioned space with the use of a variable frequency drive and controller retrofitted to a constant volume air handling system.

Referring again to the drawings, FIG. 4 represents a method of heating a conditioned space with a variable frequency drive installed on a constant volume air handling system. At step 402, the heating method 400 determines the heating load required by the conditioned space. The heating load is determined by a combination of data values such as temperature and humidity and the presence of people in the conditioned space. At step 404, the controller analyzes the collected data and determines if the conditioned space requires the addition of heat. If the controller determines that heat is not required then the controller will instruct the variable frequency drive to reduce the volumetric flow rate 406 to the conditioned space. Based on other criteria, such as air quality, the controller can adjust the lower threshold of desired air movement to maintain a sufficient quality of air in the conditioned space. If the controller determines that heat is required, the controller will instruct the variable frequency drive to increase the volumetric flow rate of air 408 to the conditioned space. The controller can monitor the conditioned space temperature and reduce the volumetric air flow rate to a value less than would otherwise be possible with a constant volume air handling system therefore requiring less heat and expense and maintaining a more comfortable environment in the conditioned space.

Figure 5:
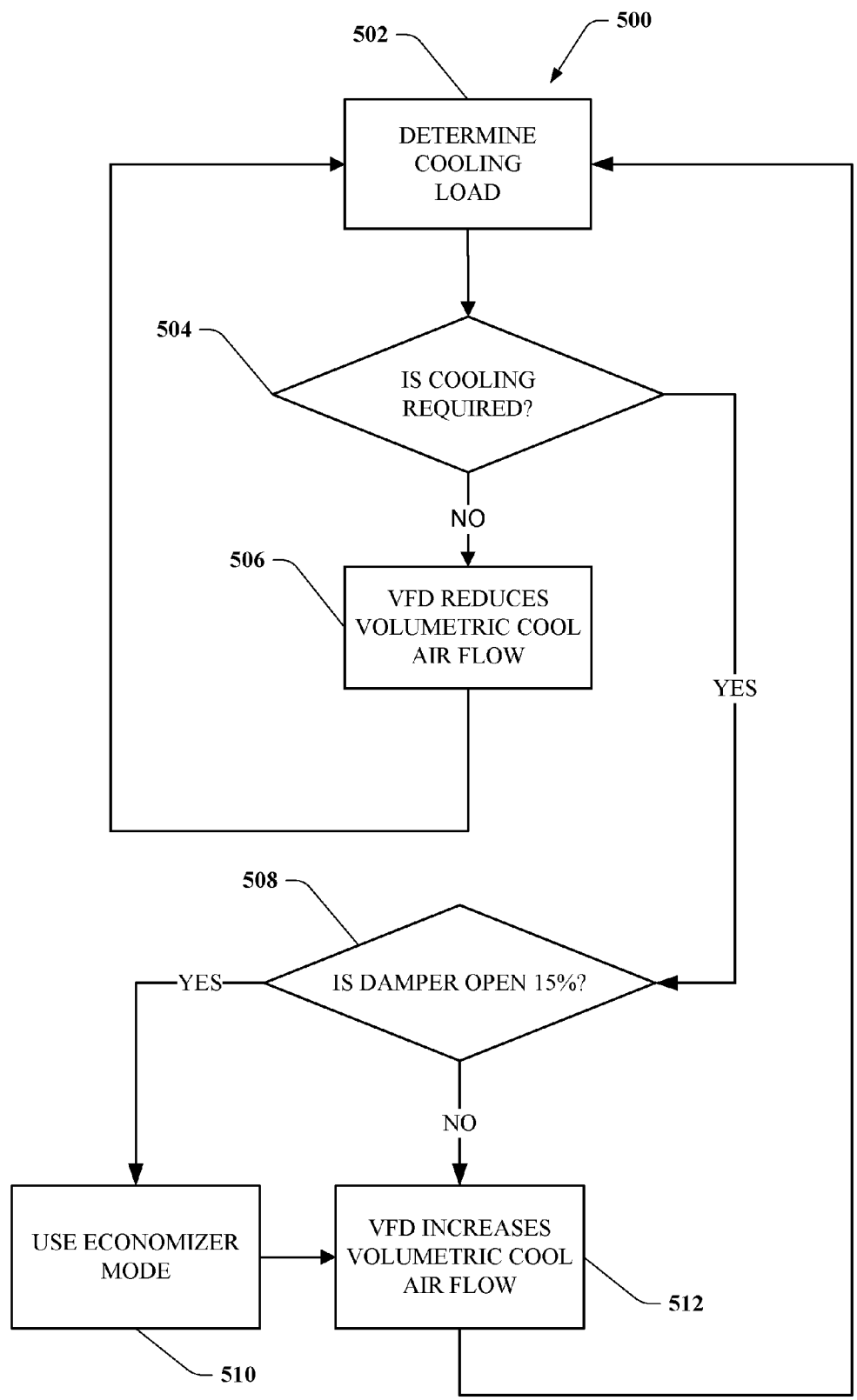
FIG. 5 depicts a method of satisfying a cooling requirement to a conditioned space with the use of a variable frequency drive and controller retrofitted to a constant volume air handling system based on a determination of the opening of an outside air damper.

Referring again to the drawings, FIG. 5 represents a method of satisfying a cooling load required by a conditioned space either by using cooling coils to reduce the air temperature or by injecting outside air into the conditioned space if the outside air meets the appropriate cooling requirements. The use of outside air for cooling conditioned space is commonly known as operating in economizer mode. At step 502, the controller determines the required cooling load for the conditioned space. The controller makes this determination via the damper end switch position. After collecting the required data for analysis, the controller determines at step 504 if cooling is required. If the controller determines that no cooling is required then the controller reduces the volumetric air flow at step 506 by instructing the variable frequency drive to reduce the angular velocity of the blower dedicated to the conditioned space. If the controller determines that cooling is required, then the controller determines at step 508 if the outside air damper is open at least fifteen percent. If the outside air damper is open at least fifteen percent then the controller at step 510 uses the outside air to reduce the heat in the conditioned space. The controller at step 512 instructs the variable frequency drive to increase the angular velocity of the blower to provide the appropriate amount of cool air to the conditioned space to meet the control point requirements.

In another aspect of the subject innovation, the controller can increase the volumetric air flow to the conditioned space to maintain required air quality based on carbon dioxide concentration in the conditioned space. This can require alternative stages of heating and cooling to maintain the desired temperature and humidity while providing adequate air quality.

Figure 6:
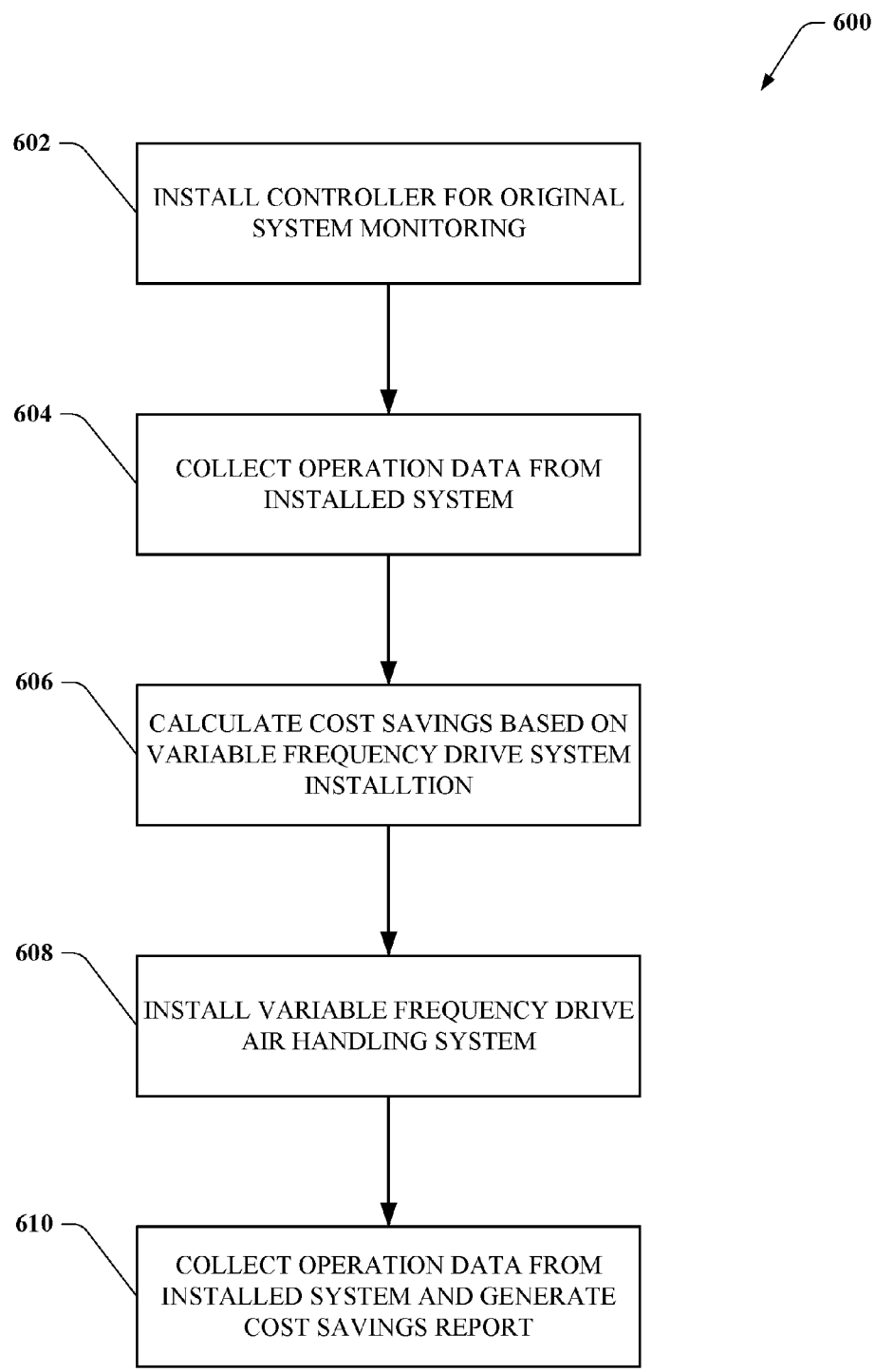
FIG. 6 depicts a method of predicting the cost savings of installing a variable frequency drive (VFD) and a VFD control module and of validating the results of the prediction after the system is installed.

Referring again to the drawings, FIG. 6 represents a method of operating the controller and variable frequency drive to perform a system analysis before installing the variable frequency drive, generating a report predicting accurate estimates of cost savings with the use of the variable frequency drive and providing reports of actual cost savings after the installation of the variable frequency drive. In one aspect of method 600 illustrated at step 602, the VFD controller module is installed on the existing constant volume air handling system. The VFD controller module is communicatively connected at the existing control system and operated in a monitoring mode.

In another aspect of method 600 illustrated at step 604, the VFD controller module, over a period of approximately two weeks, collects data of the operational characteristics of the existing system. The VFD controller module monitors conditioned space temperature, humidity, occupation and air quality, outdoor temperature and humidity, periods of operation of heating coils or cooling coils and the opportunity for the system to operate in economizer mode.

In another aspect of the subject innovation illustrated at step 606, the VFD controller module generates a report comparing the current operation and expense of the constant volume air handling system with the projected operation and expense of the variable temperature variable volume variable frequency drive air handling system. The report accurately predicts the cost savings on an annual basis after the installation of the variable frequency drive and can be used as a pre-sales tool to convince the end user of the value of installing the variable frequency drive air handling system.

In another aspect of the method 600 illustrated at step 606 the VFD controller module uses the Affinity Law to calculate the savings based on a reduction in angular velocity. The Affinity Law states that a reduction in angular velocity results in a proportional reduction in flow and this translates into a reduction in energy requirements and accordingly a reduction in operating expense. For example, power varies as the cube of speed, therefore a flow rate of 50% equates to a power requirement of only 12.5% and a fan speed of 80% equates to a 48.8 reduction in energy requirements.

In another aspect of the subject innovation illustrated at step 608, the variable frequency drive and its associated VFD controller module is installed on the existing constant volume air handling system. The VFD control module monitors many of the existing data points provided by the existing constant volume air handling system and its controller. Once in operation, the variable frequency drive and the VFD controller module operate the blower based on the data collected from the existing data points and the new data points installed for the VFD controller to control both the flow of air exiting the air handling system and the amount of heat removed from or added to the air.

In another aspect of the method 600 illustrated at step 610, the VFD control module collects data based on the operation of the variable frequency drive and the VFD control module. The VFD control module combines this data with data from the embedded weather service data and calculates monthly efficiency reports for verification that the variable frequency drive is providing the savings specified in the preliminary report generated at step 606. The reports are condensed into annual reports at the end of each year and maintained for a period of fifteen years.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

It should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, media, or a carrier in conjunction with such computer-readable device or media.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, industrial controllers and the like, each of which can be operatively coupled to one or more associated devices.

The illustrated aspects of the claimed subject matter can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Suitable combinations of the any of the above should also be included within the scope of communication media derived from computer-readable media and capable of subsequently propagating through electrically conductive media, (e.g., such as a system bus, microprocessor, data port, and the like) and/or non-electrically conductive media (e.g., in the form of radio frequency, microwave frequency, optical frequency and similar electromagnetic frequency modulated data signals).

Figure 7:
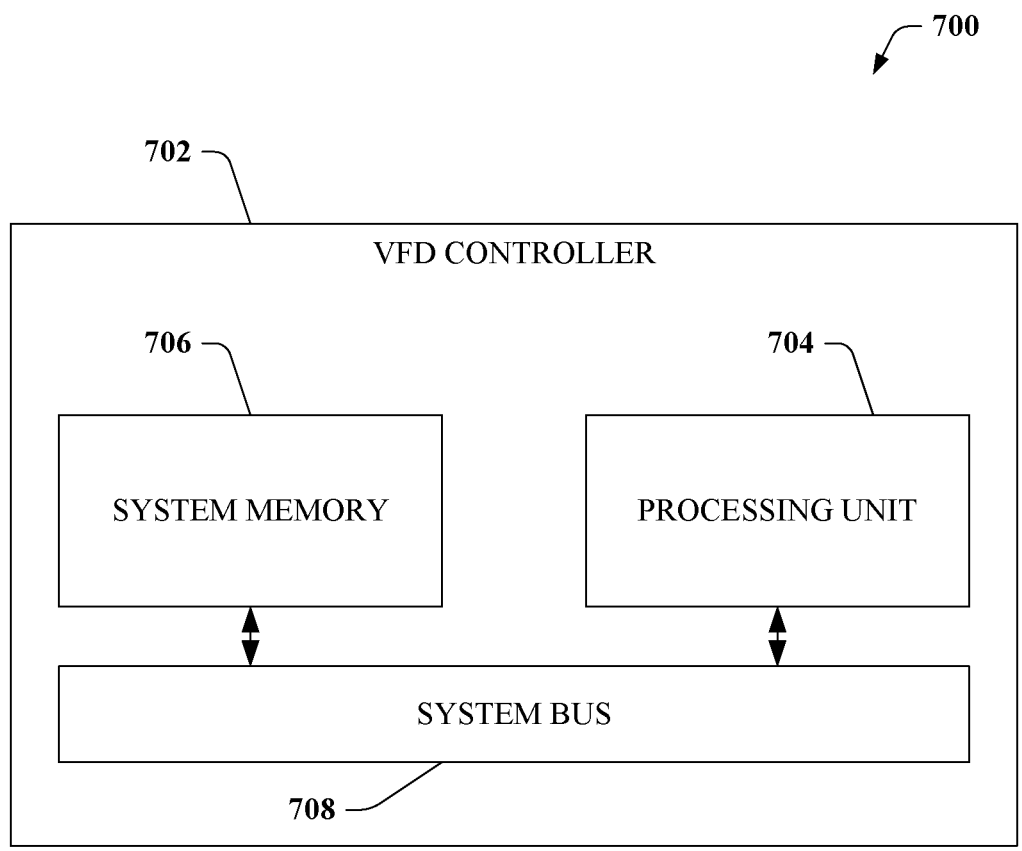
FIG. 7 depicts a block diagram of the variable frequency drive controller illustrating components of the controller.

With reference to FIG. 7, the exemplary environment 700 for implementing various aspects includes a variable frequency drive controller 702, the controller 702 including a processing unit 704, a system memory 706 and a system bus 708. The system bus 708 couples system components including, but not limited to, the system memory 706 to the processing unit 704. The processing unit 704 can be any of various commercially available processors, such a single core processor, a multi-core processor, or any other suitable arrangement of processors. The system bus 708 can be any of several types of bus structure that can further interconnect to a memory bus (with or without a memory controller), a peripheral bus, and a local bus using any of a variety of commercially available bus architectures. The system memory 706 can include read-only memory (ROM), random access memory (RAM), high-speed RAM (such as static RAM), EPROM, EEPROM, and/or the like. Additionally or alternatively, the computer 702 can include a hard disk drive, upon which program instructions, data, and the like can be retained. Moreover, removable data storage can be associated with the computer 702. Hard disk drives, removable media, etc. can be communicatively coupled to the processing unit 704 by way of the system bus 708.

The system memory 706 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 702 through one or more wired/wireless input devices, such as a keyboard, pointing and clicking mechanism, pressure sensitive screen, microphone, joystick, stylus pen, etc. A monitor or other type of interface can also be connected to the system bus 708.

The computer 702 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 702 can connect to other devices/networks by way of antenna, port, network interface adaptor, wireless access point, modem, and/or the like.

The computer 702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

Figure 8:
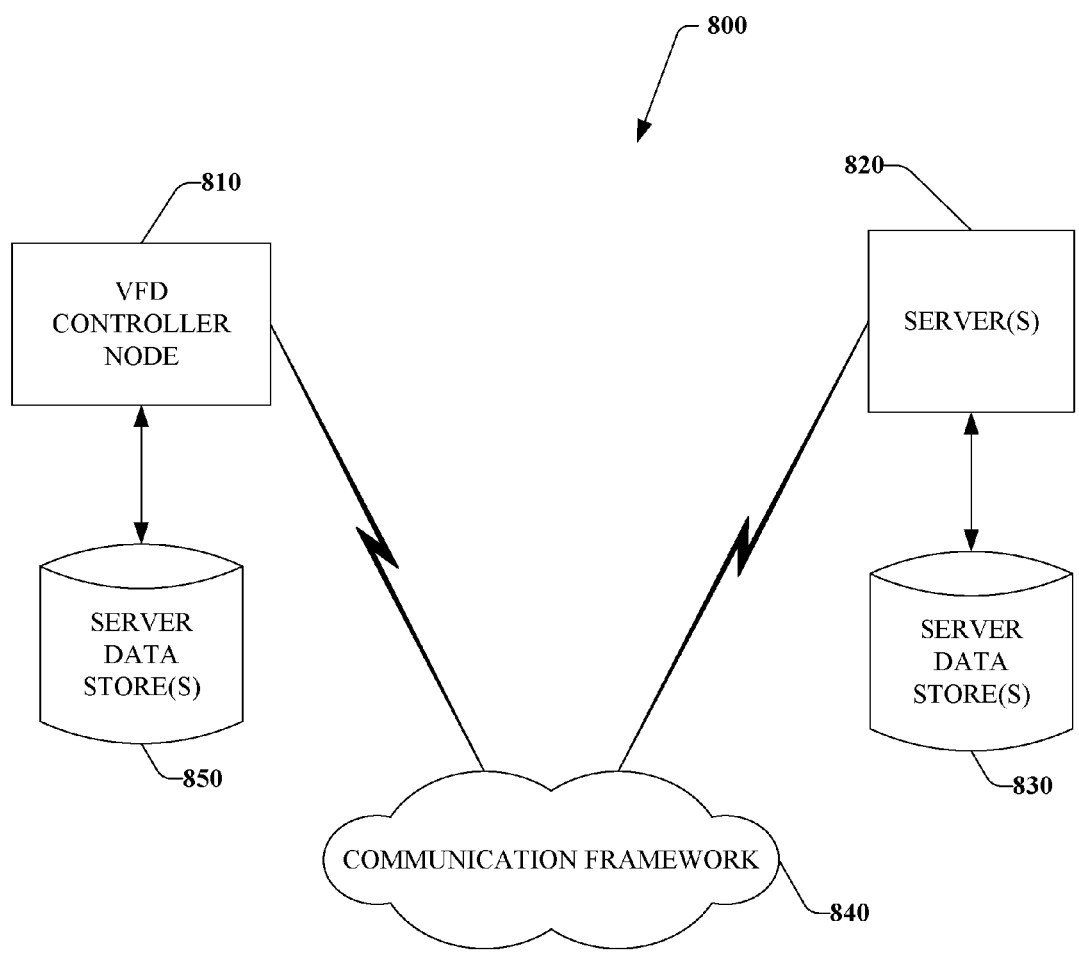
FIG. 8 depicts a representative communication network between a VFD controller node and a data collection server.

FIG. 8 is a schematic block diagram of a sample-computing environment 800 within which the disclosed and described components and methods can be used. The system 800 includes one or more client(s) 810. The client(s) 810 can be hardware and/or software (for example, threads, processes, computing devices). The system 800 also includes one or more server(s) 820. The server(s) 820 can be hardware and/or software (for example, threads, processes, computing devices). The server(s) 820 can house threads or processes to perform transformations by employing the disclosed and described components or methods, for example. Specifically, one component that can be implemented on the server 820 is a security server.

The server may be a powered device that incorporates more complex, computational and energy intensive analysis of the data from one or more VFD controller nodes 810. The server may perform computation that includes trending, modeling, strategy selection, state estimation, archiving, and distribution of new code, data, and strategies to be downloaded to one or more remote VFD controller nodes. Both the VFD controller nodes 810 and the servers 820 may support wired or wireless communications and may be self-powered or externally powered. Additionally, various other disclosed and discussed components can be implemented on the server 820.

One possible means of communication between a client 810 and a server 820 can be in the form of a data packet adapted to be transmitted between two or more computer processes. The system 800 includes a communication framework 840 that can be employed to facilitate communications between the client(s) 810 and the server(s) 820. The client(s) 810 are operably connected to one or more client data store(s) 850 that can be employed to store information local to the client(s) 810. Similarly, the server(s) 820 are operably connected to one or more server data store(s) 830 that can be employed to store information local to the server(s) 820.

The VFD controller nodes can operate as a network or in a peer to peer configuration. Data and information can be exchanged among the VFD controller nodes to permit each to perform their intended operation or to collectively share the information across the collection of VFD controller nodes. The VFD controller nodes can also share configuration information across the communication framework or use the server data stores 830 as a backup for storing configuration information.

Figure 9:
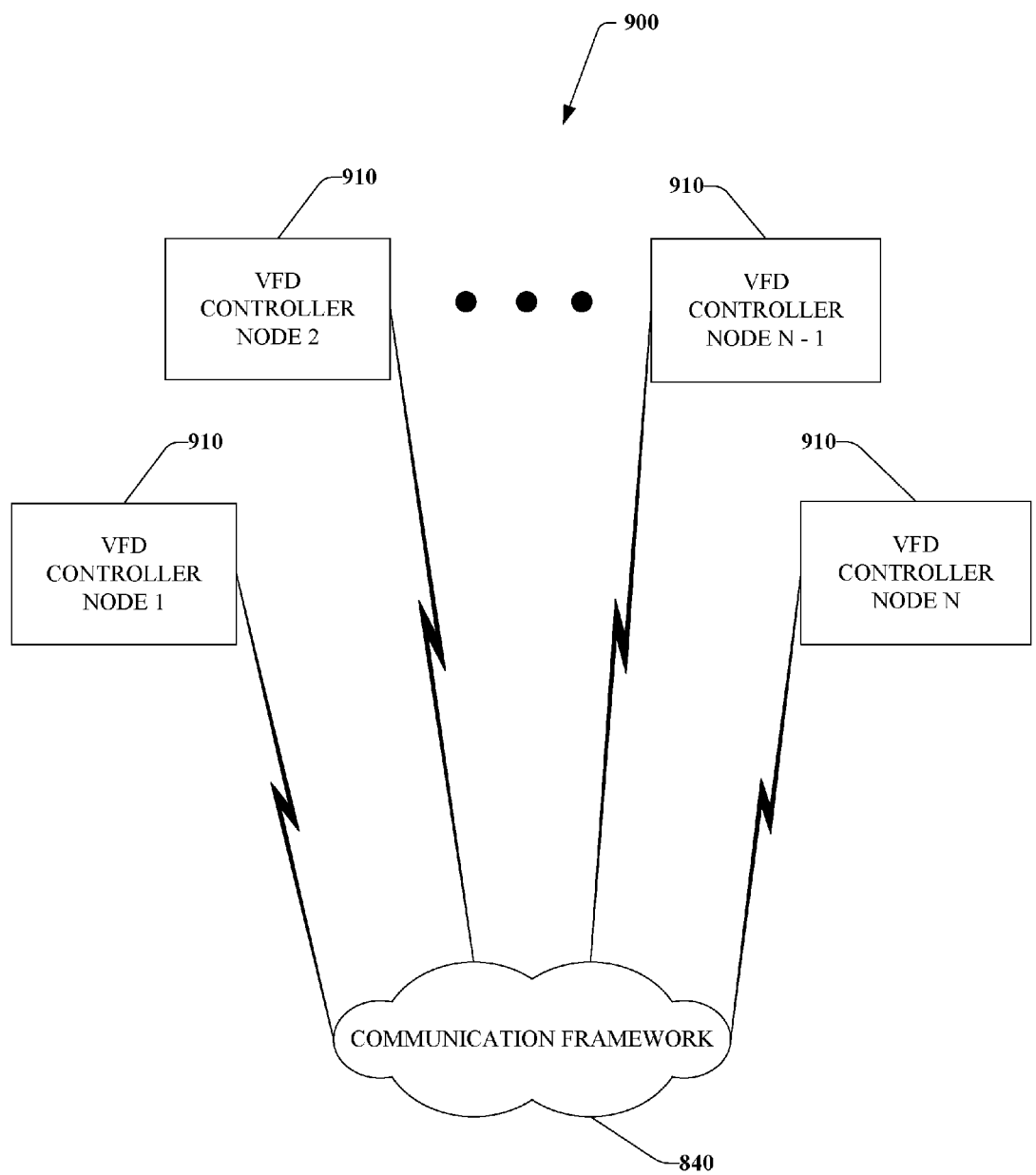
FIG. 9 depicts a block diagram of multiple VFD controller systems communicatively sharing information.

Referring again to the drawings, FIG. 9 illustrates an embodiment of the subject invention where a plurality of VFD and controller systems can operate collaboratively based on their proximity or based on their operating objective or other common attributes. For instance, as described previously, the VFD and controller system can be attached to the same equipment 100 and serve as redundant backups of each other. In another example, again as previously described, the VFD controller nodes can operate in turn, communicating control information as a token to coordinate operation as the one holding the token works while the others are dormant due to motion detectors indicating the lack of people in any given conditioned space area.

In yet another embodiment, the VFD and controller systems can operate in a series fashion, for example VFD controller node 1 can transmit its information to VFD controller node 2 which proceeds to transfer the cumulative information to VFD controller node N-1 and in a similar fashion transmits the further accumulated information to VFD controller node N where the total information is transmitted to a server 1420. This mechanism permits the accumulation of data and conditions from areas that might not be able to communicate to a central server in any other fashion.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
a processor; and
a memory communicatively coupled to the processor, the memory having stored therein computer-executable instructions, comprising:
a controller component configured to:
determine a temperature difference between an intake air temperature at an entrance of a heat exchange area of a constant volume air handling unit and a discharge air temperature at an exit of the heat exchange area of the constant volume air handling unit;
determine an angular velocity for a blower based at least upon the determined temperature difference to achieve a predetermined heating or cooling demand for a conditioned space; and
set at least one parameter of a variable frequency drive to cause the blower to achieve the determined angular velocity.

2. The system of claim 1, wherein the controller is further configured to determine the angular velocity based at least upon an air quality parameter associated with the conditioned space.

3. The system of claim 1, wherein the controller is further configured to determine the angular velocity based at least upon a motion parameter associated with the conditioned space.

4. The system of claim 1, wherein the controller is further configured to determine the angular velocity based at least upon a damper parameter associated with a position of an outside air damper.

5. The system of claim 4, wherein the controller is further configured to instruct a damper switch to set the outside air damper to a first position determined based upon at least one of the damper parameter, the intake air temperature, the discharge air temperature, an air quality parameter, or a motion parameter.

6. The system of claim 1, wherein the controller is further configured to:
determine whether the discharge air temperature has reached a first temperature indicative of a cooling coil in the constant volume air handling unit beginning to freeze; and
in response to the discharge air temperature reaching the first temperature, increase the angular velocity.

7. The system of claim 1, wherein the controller is further configured to:
  determine whether the discharge air temperature has reached a second temperature indicative of a heating coil in the constant volume air handling unit beginning to overheat; and
  in response to the discharge air temperature reaching the second temperature, increases the angular velocity.

8. The system of claim 1, wherein the controller is further configured to determine an actual cost savings based upon an actual cost of the system for a historical period of time for a plurality of determined angular velocities as compared to an estimated cost for the historical period of time at a constant angular velocity.

9. The system of claim 1, wherein the controller is further configured to determine a predicted costs savings based upon a predicted cost of the system for a future period of time for a plurality of determined angular velocities as compared to an estimated cost for the future period of time at a constant angular velocity.

10. A method comprising:
  determining, by a system including a processor, an intake air temperature of air at an entrance of a heat exchange area of a constant volume air handling unit;
  determining, by the system, a discharge air temperature of air at an exit of the heat exchange area of the constant volume air handling unit;
  determining, by the system, a temperature difference between the intake air temperature and the discharge air temperature;
  determining, by the system, an angular velocity for a blower based at least upon the determined temperature difference to achieve a predetermined heating or cooling demand for a conditioned space; and
  setting, by the system, at least one parameter of the variable frequency drive to cause the blower to achieve the determined angular velocity.

11. The method of claim 10, further comprising determining, by the system, the angular velocity based at least upon an air quality parameter associated with the conditioned space.

12. The method of claim 10, further comprising determining, by the system, the angular velocity based at least upon a motion parameter associated with the conditioned space.

13. The method of claim 10, further comprising determining, by the system, the angular velocity based at least upon a damper parameter associated with a position of an outside air damper.

14. The method of claim 10, further comprising:
  determining, by the system, whether the discharge air temperature has reached a first temperature indicative of a cooling coil in the constant volume air handling unit beginning to freeze; and
  in response to the discharge air temperature reaching the first temperature, increasing, by the system, the angular velocity.

15. The method of claim 10, further comprising:
  determining, by the system, whether the discharge air temperature has reached a second temperature indicative of a heating coil in the constant volume air handling unit beginning to overheat; and
  in response to the discharge air temperature reaching the second temperature, increasing, by the system, the angular velocity.

16. The method of claim 10, further comprising determining, by the system, a predicted costs savings based upon a predicted cost of the method for a future period of time for a plurality of determined angular velocities as compared to an estimated cost for the future period of time at a constant angular velocity.

17. A non-transitory computer-readable medium having instructions stored thereon that, in response to execution, cause at least one device including a processor to perform operations comprising:
  determining an upstream intake air temperature of air at an entrance of a heat exchange area of a constant volume air handling unit;
  determining a discharge air temperature of air at an exit of the heat exchange area of the constant volume air handling unit;
  determining a temperature difference between the intake air temperature and the discharge air temperature;
  determining an angular velocity for a blower based at least upon the determined temperature difference to achieve a predetermined heating or cooling demand for a conditioned space; and
  setting at least one parameter of the variable frequency drive to cause the blower to achieve the determined angular velocity.

18. The system of claim 17, the operations further comprising:
  determining whether the discharge air temperature has reached a first temperature indicative of a cooling coil in the constant volume air handling unit beginning to freeze; and
  in response to the discharge air temperature reaching the first temperature, increasing the angular velocity.

19. The system of claim 17, the operations further comprising:
  determining whether the discharge air temperature has reached a second temperature indicative of a heating coil in the constant volume air handling unit beginning to overheat; and
  in response to the discharge air temperature reaching the second temperature, increasing the angular velocity.

20. The system of claim 17, the operations further comprising determining a predicted costs savings based upon a predicted cost of the method for a future period of time for a plurality of determined angular velocities as compared to an estimated cost for the future period of time at a constant angular velocity.

* * * * *